H. McQUILLIN.
DYNAMO ELECTRIC MACHINE.
APPLICATION FILED MAR. 15, 1915.

1,203,759.

Patented Nov. 7, 1916.

Witnesses:

Inventor
Howard McQuillin
By Forée Bain & May attys

UNITED STATES PATENT OFFICE.

HOWARD McQUILLIN, OF CHICAGO, ILLINOIS.

DYNAMO-ELECTRIC MACHINE.

1,203,759.

Specification of Letters Patent.  Patented Nov. 7, 1916.

Application filed March 15, 1915.  Serial No. 14,306.

*To all whom it may concern:*

Be it known that I, HOWARD McQUILLIN, a citizen of the United States, residing at Chicago, in the county of Cook and State of Illinois, have invented certain new and useful Improvements in Dynamo-Electric Machines, of which the following is a specification.

My invention relates to improvements in dynamo electric machines and more particularly to a generator in which the armature is endwise movable.

One of the particular objects of my invention is to provide a positive and efficient driving connection between a pulley, gear or the like and the shaft of an axially movable armature, such as illustrated and described in my copending application entitled Dynamo electric machines, filed by me March 13th, 1914, and Serially Numbered 824,421.

Another object of my invention is to provide improved oiling means for proper lubrication of the axially shiftable shaft so that lubricant is conducted to the bearings from reservoirs when the armature is rotating, the supply being cut off when the armature is idle, and the consequent tendency for oil to pass into the interior of the dynamo casing prevented.

Another object of my invention is the provision of improved commutating means by which the field current value is automatically regulated.

Figure 1:
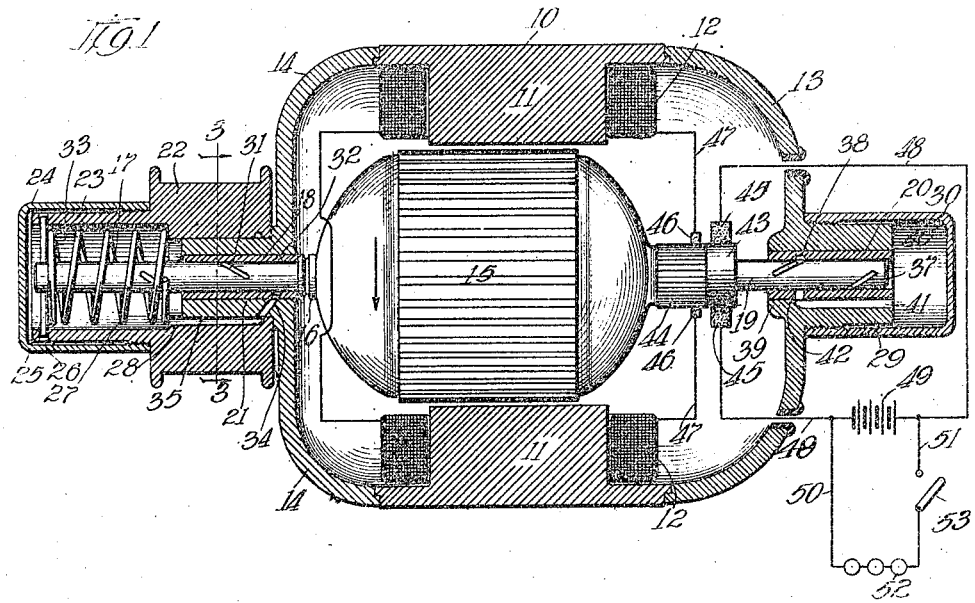
Figure 2:
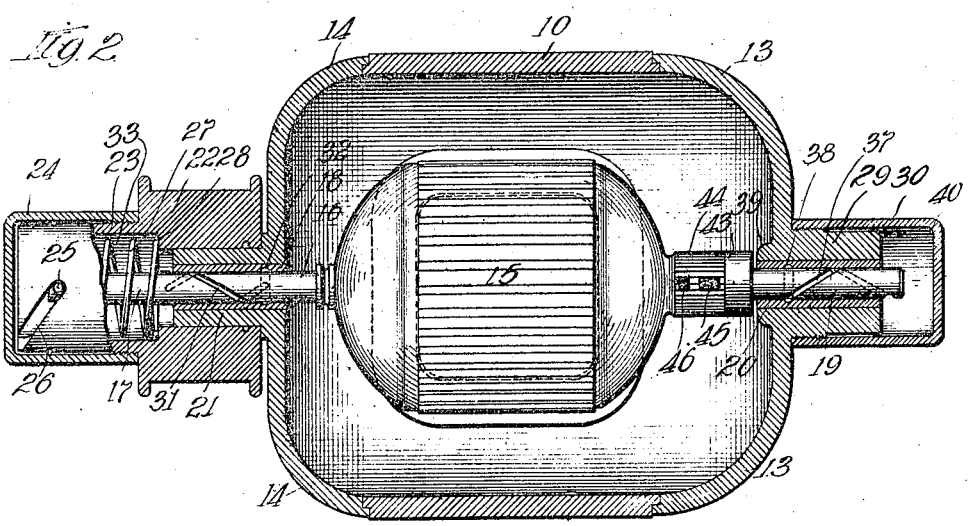
Figure 3:
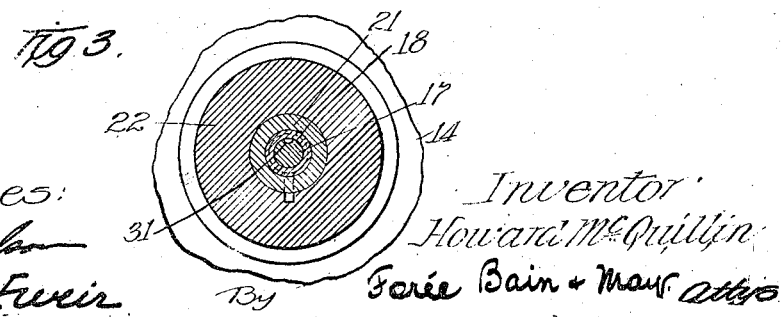

Other and further objects will become apparent to those skilled in the art from a consideration of the following description and drawings, wherein:

Figure 1 is an axial sectional view of my improved dynamo. Fig. 2 is an axial sectional view taken on a plane at 90 degrees to the plane on which Fig. 1 is taken, and Fig. 3 is a transverse sectional view on the line 3—3 of Fig. 1.

Referring to the drawings the numeral 10 indicates the frame of a dynamo electric machine from which extend inwardly the pole pieces 11—11 carrying the field windings 12—12. An inclosing head 13 extends from the commutator end of the field supporting casing inwardly, and not only incloses the armature at that end but also provides support for a shaft bearing. A similar cap or casing head 14 is provided at the other end of the dynamo frame.

The armature 15 is provided with a shaft 16 which extends as at 17 considerably beyond the bushing 18 carried by the head 14 and at the other end extends as at 19 a distance greater than the length of the bushing 20 carried in the head 13.

The bushing 18 is positioned within the hub 21 which extends outwardly from the head 14 and has journaled on its periphery a drive pulley 22 from which projects a tubular hub 23 over which is screw threaded a cap 24. Obviously this part through which power is applied to the apparatus may be either a gear, a clutch member, or a coupling of any suitable form.

A pin 25 extends through a hole drilled in the end 17 of the armature shaft into engagement with diagonally positioned diametrically opposite slots 26—26 in the pulley hub 23. Inclosed within the pulley hub 23 is a coil spring 27, the inner end of which abuts against a shoulder 28 provided on the interior of the pulley, the outer end abutting against the pin 25. The tendency of this spring is to normally hold the armature in the position indicated in Fig. 1 with the pin 25 at the outer end of the slots 26—26.

At the commutator end of the dynamo a bushing 20 is carried within the hub 29 which projects outwardly from the casing head 13 and has threaded upon its periphery a lubricant inclosing cap 30.

A portion of the end 17 of the shaft 16 is spirally grooved as at 31, the inner end of the spiral being terminated at a point which registers with an annular groove 32 formed in the bushing 18 at a point near its inner end, when the armature is in its inner operating position. The outer end of the spiral groove 31 at all times communicates with the lubricant receiving chamber 33 provided by the tubular hub extension 23 of the pulley 22. When the dynamo armature is in the position shown in Fig. 1, its idle position, the inner end of the groove 31 does not register with the annular groove 32 and communication between the oil chamber and this groove is then cut off. A hole 34 extends from the outer face of the hub 21 through the bushing into communication with the annular groove 32 in the inner surface of the bushing and from thence communicates through a slot 35 with the chamber 33. From the above description it will be evident that lubricant normally flows through the slot 35 into the hole 34, thence into the annular groove 32, and when the armature is in its operative position as indicated in Fig. 2, is then carried outwardly along the spiral groove 31 and returned to the oil chamber, the spiral being directed so as to act as a screw and draw the oil from the inner end outwardly when rotated in the direction indicated by the arrow in Fig. 1. Obviously if the armature is to be rotated in the opposite direction the direction of the spiral groove 31 will be reversed.

A similar provision is made for lubricating the other end of the shaft 19 by means of a spiral groove 37, the inner end of which, when the armature is in its operating position, registers with the annular groove 38 in the inner face of the bushing 20. The inner end of the casing hub 29 and the bushing 20 is extended inwardly a sufficient distance as at 39 so as to cover the inner end of the groove 37 when the armature is idle as in Fig. 1 and prevent communication between the lubricant chamber 40 within the end of the cap 30 and the interior of the armature casing. A slot 41 extends along the inner face of the hub 29 and its inner end registers with an opening 42 communicating with the annular groove 38. Obviously the spiral 37 is inclined in an opposite direction from the inclination of spiral 31, as at this end the tendency to move the lubricant axially must be in the opposite direction, namely from the inside out or to the right.

As in my previously referred to earlier application I have provided an insulated extension 43 on the end of the commutator 44. Normally when the armature is idle as shown in Fig. 1 the line brushes 45—45 rest on the insulated extension 43 whereas the field excitation brushes 46—46 at all times register with the commutator segments 44. Current flows from the field excitation brushes 46—46 over wires 47—47 through the field windings 12—12. In the particular embodiment of my invention it will be noted that the field excitation brushes 46—46 are very much smaller than the main brushes 45—45, the area of the field excitation brushes being relatively small in order to cut down or limit the amount of current that may be supplied to the field and thus act as a regulator at high speed.

In this particular embodiment of my invention I have shown the main brushes 45—45 as being connected by means of the leads 48—48 to the opposite terminals of a storage battery 49. This circuit is constantly closed except when the armature slides axially to the left as in Fig. 1 and interposes the insulated section 43 between the brushes 45—45, thus automatically acting as a cut out when the rotation of the armature is so low as to provide insufficient excitation of the field to overcome the resistance of the spring 27. Wires 50, 51 are shown as connected to the opposite terminals of the battery 49 for supplying current to translating devices 52, a switch 53 being interposed in the wire 51.

When the armature is at rest it will, as previously described, assume the position shown in Fig. 1, the spring 27 serving to hold it at the left end of its movement. As the pulley wheel 22 is driven in the direction of the arrow indicated in Fig. 1, the field will gradually be built up due to residual magnetism, thus effecting a solenoid or sucking action which draws the armature to the center of the magnetic field. As this action increases the magnetic lag will become greater and the resistance between the pin 25 and slots 26—26 thereby increased giving the screw or cam action of the slots opportunities to throw the armature inward and hold it in its normal position. This gives a quick making of the contact between the brushes 45—45 and the commutator 44. The diagonal positioning of the grooves or slots likewise prevents the armature from moving laterally back and forth with small speed variations, and the armature does not partially or entirely return to its first position until the speed decreases materially thus weakening the field excitation current to a very low value. The armature during its normal operation is in position in the center of the field and the magnetic drag assists in keeping the pin locked at the inner end of its slot.

Having described my invention, what I claim is:

1. In a dynamo electric machine, the combination of a rotatable and endwise movable shaft, an armature mounted thereon, a bearing for said shaft, and a spiral oil groove formed on the shaft, the inclination of the groove outwardly from the armature being away from the direction of rotation and its inner end terminating at a point at all times within the axial confines of the bearing.

2. In a dynamo electric machine, the combination of a rotatable and endwise movable shaft, an armature mounted thereon, a bearing for said shaft, an annular groove formed within said bearing adjacent its inner end, means for supplying oil to said groove, and a spiral groove formed on the portion of the shaft adjacent the bearing, the inclination of the groove outwardly from the armature being away from the direction of rotation and its inner end positioned at a point registering with the aforesaid annular groove in the bearing when the shaft is in its operative position.

3. In a dynamo electric machine, the combination of a rotatable, endwise movable shaft, an armature mounted thereon, means for resiliently holding the shaft at one extreme end of its movement, means operable upon the rotation of the shaft for moving the same to the opposite position, a bearing for said shaft, an annular oil groove formed in said bearing near its inner end, an oil reservoir, a duct leading from said reservoir to the annular groove, and a spiral oil groove formed on the shaft, the inclination of the groove outwardly from the armature being away from the direction of rotation, its inner end being positioned on the shaft for registering with the annular oil groove when the shaft is in its last mentioned position and the other end of the oil groove extending beyond the bearing.

4. In a dynamo electric machine, the combination of a rotatable endwise movable armature shaft, a rotatable power transmitting means rotatable thereabout, said means having diametrically opposite inclined surfaces thereon, projections on the shaft in sliding engagement with the surfaces and means within the confines of said power transmitting means for resiliently holding the projections at the outer end of the said surfaces.

5. In a dynamo electric machine, the combination of a rotatable endwise movable armature shaft, a drive means having a tubular projection rotatable thereabout, said drive means having diametrically opposite slots formed therein, projections on the shaft in sliding engagement with the slots, said drive means having an abutment formed within, and a coil spring positioned within the tubular extension and abutting at one end against the abutment on the drive means and at its other end against said projections on the shaft.

6. A device of the character described comprising a rotor and a housing inclosing the same, a rotor carrying shaft supported at each end in the housing, a lubricant retaining member overlying one end of the shaft and secured to the housing, and a rotatable member connected to and inclosing the opposite end of the shaft, said member being rotatably supported on the housing.

7. A device of the character described comprising a rotor and a housing inclosing the same, a rotor carrying shaft supported at each end in the housing, and a rotatable member connected to and completely inclosing one end of the shaft, said member being rotatably supported on the housing.

8. A device of the character described comprising a rotor, a housing inclosing the same and having a hub projecting from each end of the housing, a rotor carrying shaft journaled in said hubs, a lubricant retaining cap overlying the end of one of said hubs and inclosing the shaft end, a tubular rotatable member connected to the shaft and journaled on the other hub, and a cover for the projecting end of said member.

9. The combination with a rotor and a frame having a projection thereon of a rotor carrying shaft extending at one end through the projection, a rotatable member journaled on the projection, and means connecting the shaft and member and preventing outward axial displacement of the latter.

10. The combination with a rotor and a frame having a projection thereon of a rotor carrying shaft, journaled at one end in the projection, a rotatable member journaled on the projection, and means connecting the shaft and member and preventing outward axial displacement of the latter with respect to the shaft.

11. The combination with a rotor and a frame having a projection thereon of a rotor carrying shaft extending at one end through the projection, a rotatable member connected with the shaft and journaled on the projection, and means rotatable with the said member for preventing axial displacement thereof.

12. The combination with a rotor and a frame having a projection thereon of a rotor carrying shaft extending at one end through the projection, a rotatable member connected with the shaft and journaled on the projection, said frame having an abutment against which the rotatable member abuts, and resilient means for holding said member in engagement with the abutment.

13. The combination with a rotor and a rotor inclosing housing having a tubular hub projecting therefrom of a rotor carrying shaft journaled at one end in the hub, a power transmitting member journaled on the hub, and a flexible connection between the shaft and said member.

14. The combination with a rotor and a rotor inclosing housing having a tubular hub projecting therefrom of a rotor carrying shaft journaled at one end in the hub, a power transmitting member journaled on the hub and having a tubular projection, a connection between said shaft and member, and a lubricant retaining cap overlying the end of the tubular projection.

15. The combination with a rotor and a rotor inclosing housing having a tubular hub projecting therefrom of a rotor carrying shaft journaled at one end in the hub, a power transmitting member journaled on the hub and having a tubular projection with openings therein, a pin projecting through said shaft into engagement with said openings in the tubular projection, and resilient means for holding said member against the housing end.

16. The combination with a rotor and a rotor inclosing housing having a tubular hub projecting therefrom of a rotor carrying shaft journaled at one end in the hub, a power transmitting member journaled on the hub and having a tubular projection, said hub having a shoulder on the inner end thereof against which the member abuts, the interior of the member having an abutment formed thereon and said shaft having an abutment and a spring interposed between said abutments.

17. The combination with a rotor and an inclosing housing having an abutment thereon, of a rotor carrying shaft, a power transmitting means rotatable about one end of the shaft, said member having a slot therein, a projection on the shaft in sliding engagement with the slot, said transmitting means having an abutment thereon, and a spring positioned entirely within the transmitting means and contacting at its ends with the projection on the shaft and the abutment within the power transmitting means to press the latter resiliently in contact with the abutment on the housing.

18. The combination with a rotor and a rotor inclosing frame having a tubular hub projecting therefrom of a rotor carrying shaft journaled at one end in the hub, a pulley journaled on the hub and having a tubular extension projecting therebeyond, a cover cap overlying the tubular extension and means connecting the pulley and shaft and entirely inclosed within the confines of the said cap.

19. The combination with a rotor and a rotor inclosing frame having a tubular hub projecting therefrom of a rotor carrying shaft journaled at one end in the hub, a pulley journaled on the hub and having a tubular extension projecting therebeyond and provided with axially extending slots, a cover cap overlying the tubular extension, said hub having a shoulder on the inner end thereof against which one end of the pulley abuts, a pin carried by the shaft and projecting into engagement with the axially extending slots in the tubular extension, said pulley having an abutment on the inside thereof beyond the hub, and a spring contacting at its ends with the inner abutment and the pin to press the pulley into engagement with the shoulder.

In testimony whereof I hereunto set my hand in the presence of two subscribing witnesses.

HOWARD McQUILLIN.

In the presence of—
STANLEY W. COOK,
MARY F. ALLEN.